C. H. PARSHALL.
LUBRICATOR.
No. 6,908. Reissued Feb. 8, 1876.
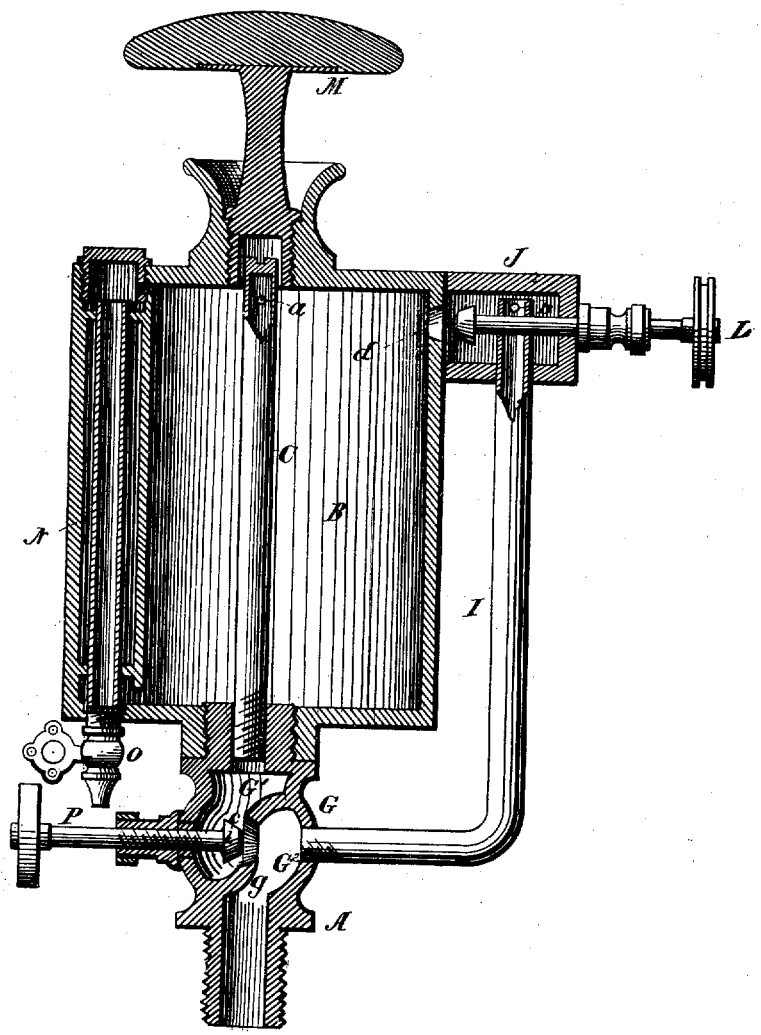
WITNESSES
E. F. Nottingham
F. O. McCleary
By
INVENTOR
Charles H. Parshall,
By Leggett & Leggett.
Attorneys.
THE NORRIS PETERS CO., PHOTO-LITHO., WASHINGTON, D. C.

UNITED STATES PATENT OFFICE.

CHARLES H. PARSHALL, OF DETROIT, MICHIGAN, ASSIGNOR OF ONE-HALF INTEREST TO JOHN R. GROUT, OF SAME PLACE.

IMPROVEMENT IN LUBRICATORS.

Specification forming part of Letters Patent No. 170,296, dated November 23, 1875; reissue No. 6,908, dated February 8, 1876; application filed January 25, 1876.

*To all whom it may concern:*

Be it known that I, CHARLES H. PARSHALL, of Detroit, in the county of Wayne and State of Michigan, have invented certain new and useful Improvements in Lubricators; and I do hereby declare the following to be a full, clear, and exact description of the invention, such as will enable others skilled in the art to which it pertains to make and use it, reference being had to the accompanying drawings, which form part of this specification.

My invention relates to lubricators for steam-engines, &c.; and consists in certain improvements in the construction of the condensing-chamber attached to top of oil-chamber, and in the construction of stem, all as and for the purposes as hereinafter more fully and at large will appear.

In the drawing is represented a vertical transverse section of my lubricator complete.

A is the screw-stem; B, the oil-reservoir; C, the oil-supply pipe united to stem A, and extending to the top of reservoir B, closed at top end, and provided with inlet-opening *a*. I is the steam-pipe, extending from chamber in bulb G up to top of condensing-chamber J, open at top, and provided with opening *b*. M is the screw-stop; N, the glass indicating-tube, and O the waste-cock.

The arrangement of these several parts above mentioned is substantially the same as that shown in my patent dated November 23, 1875. I will now proceed to point out and describe the points that are new.

Within the bulb G of stem A is a partition, *g*, provided with valve-opening *i*, dividing the bulb into two chambers, $G^1$ $G^2$. P is a hand-valve stem, with a valve, *c*, operating to close opening *i*. The condensing-chamber J is secured at the top side of the reservoir B, and is provided with an inlet-opening, *d*, entering reservoir B. L is a feed-valve operating to close opening *d*.

The operation of these parts is as follows: Valves P and L are closed and the lubricant placed in the cup, filling the same to near opening *a*. The valves are then opened—P freely and L slightly—when water, passing from the condenser through *d*, settles below into the oil, and floats the oil up to and through the opening *a*, whence it passes down the tube and stem to the parts below. When more oil is desired, more water is allowed to pass into cup B by a farther opening of valve L. Thus an even, steady, and automatic flow of oil is at all times delivered to the machinery, as is apparent.

Having thus described my invention, what I claim as new, and desire to secure by Letters Patent, is—

1. In combination with the stem A, constructed with partitioned bulb G $G^1$ $G^2$ and hand-valve *c* P, the steam-pipe I, open at top, and provided with opening *b*, connecting, through pipe I, the steam-inlet A with the inside of condensing-chamber J, situated at the top and outside of oil-reservoir B, as and for the purposes described.

2. In combination with the stem A G, reservoir B, and steam-pipe I, communicating from stem A G to top of condenser J, the condensing-chamber J, provided with hand-valve L, placed at the outside top portion of reservoir B, and communicating therewith at the top edge through opening *d*, as and for the purposes described.

3. The improved lubricator, consisting of reservoir B, oil-pipe C *a*, stem A, constructed with partitioned chambers G $G^1$ $G^2$, steam-pipe I *b*, communicating from stem *a* G to top inside of condensing-chamber J, which is placed at top outside of reservoir, communicating therewith by opening *d*, and provided with valve L, all constructed and arranged as and for the purposes described.

In testimony that I claim the foregoing I have herewith set my hand this 29th day of December, 1875.

CHARLES H. PARSHALL.

Witnesses:

JOHN B. CORLISS,

S. W. STEWART.